United States Patent [19]

Dyson

[11] Patent Number: 4,643,748
[45] Date of Patent: Feb. 17, 1987

[54] CLEANING APPARATUS

[75] Inventor: James Dyson, Bathford, England

[73] Assignee: Notetry Limited, Bristol, England

[21] Appl. No.: 832,370

[22] Filed: Feb. 24, 1986

[51] Int. Cl.⁴ ............................................. B01D 45/12
[52] U.S. Cl. ...................................... 55/338; 55/345;
55/392; 55/417; 55/429; 55/459 R
[58] Field of Search ................ 55/338, 345, 392, 417,
55/429, 459 R; 209/144, 211

[56] References Cited

U.S. PATENT DOCUMENTS

| | | | |
|---|---|---|---|
| 1,159,267 | 11/1915 | Posner | 55/345 |
| 2,768,707 | 10/1956 | Campbell | 55/429 |
| 4,200,415 | 4/1980 | Boring | 55/345 |
| 4,593,429 | 6/1986 | Dyson | 55/429 |

*Primary Examiner*—Bernard Nozick
*Attorney, Agent, or Firm*—Ian C. McLeod

[57] ABSTRACT

An improved cleaning apparatus 10 is described wherein a shroud 21 with a moveable collar 22 is provided on the outside surface 12b of a cyclone 12 in an air outlet 13d from a container 11 leading to the cyclone 12 to dislodge accumulated dirt in the air outlet when a fan 18 drawing air through the apparatus is stopped. The apparatus preferably has a disc 20 which prevents long strands, such as hair, in the dirt from clogging the air outlet 13d from the container 11. The apparatus is preferably in the form of a vacuum cleaner.

18 Claims, 8 Drawing Figures

CLEANING APPARATUS

BACKGROUND OF THE INVENTION

(1) Field of the Invention

The present invention relates to an improved vacuum cleaning apparatus. In one form the apparatus includes a movable collar which ejects dirt from an air outlet from an outer container leading to an inner cyclone. In another form the apparatus includes a disc mounted on an outside surface of the cyclone and spaced from the inner wall of the container which prevents long strands such as hair from entering the air outlet from the container to the inner cyclone. Preferably the collar and disc are used together.

(2) Prior Art

The basic cleaning apparatus with an outer cyclone or container and an inner cyclone is described in the inventor's Canadian Pat. No. 1,182,613 granted Feb. 19, 1985 and corresponding to U.S. application Ser. No. 640,758 filed Aug. 14, 1984. The inventor is unaware of any prior art describing inventions similar to the present invention. The problem with these dual cyclone devices is that dirt, particularly hair and larger dirt particles, tends to clog the air outlet from the container leading to the inner cyclone. Until the present invention, there has been no solution to the problem except to use a filter in the air outlet which defeats the purpose of a cyclonic cleaning apparatus. Filters reduce air flow through the apparatus as dirt accumulates and must be cleaned or replaced periodically.

OBJECTS

It is therefore an object of the present invention to provide an improved cleaning apparatus which reduces or eliminates the air outlet clogging problem in cyclonic cleaning apparatus. Further it is an object of the present invention to provide means for preventing the clogging of the air outlet which are simple and inexpensive to construct and avoid the need for a filter at the air outlet. These and other objects will become increasingly apparent by reference to the following description and the drawings.

IN THE DRAWINGS

Figure 1:
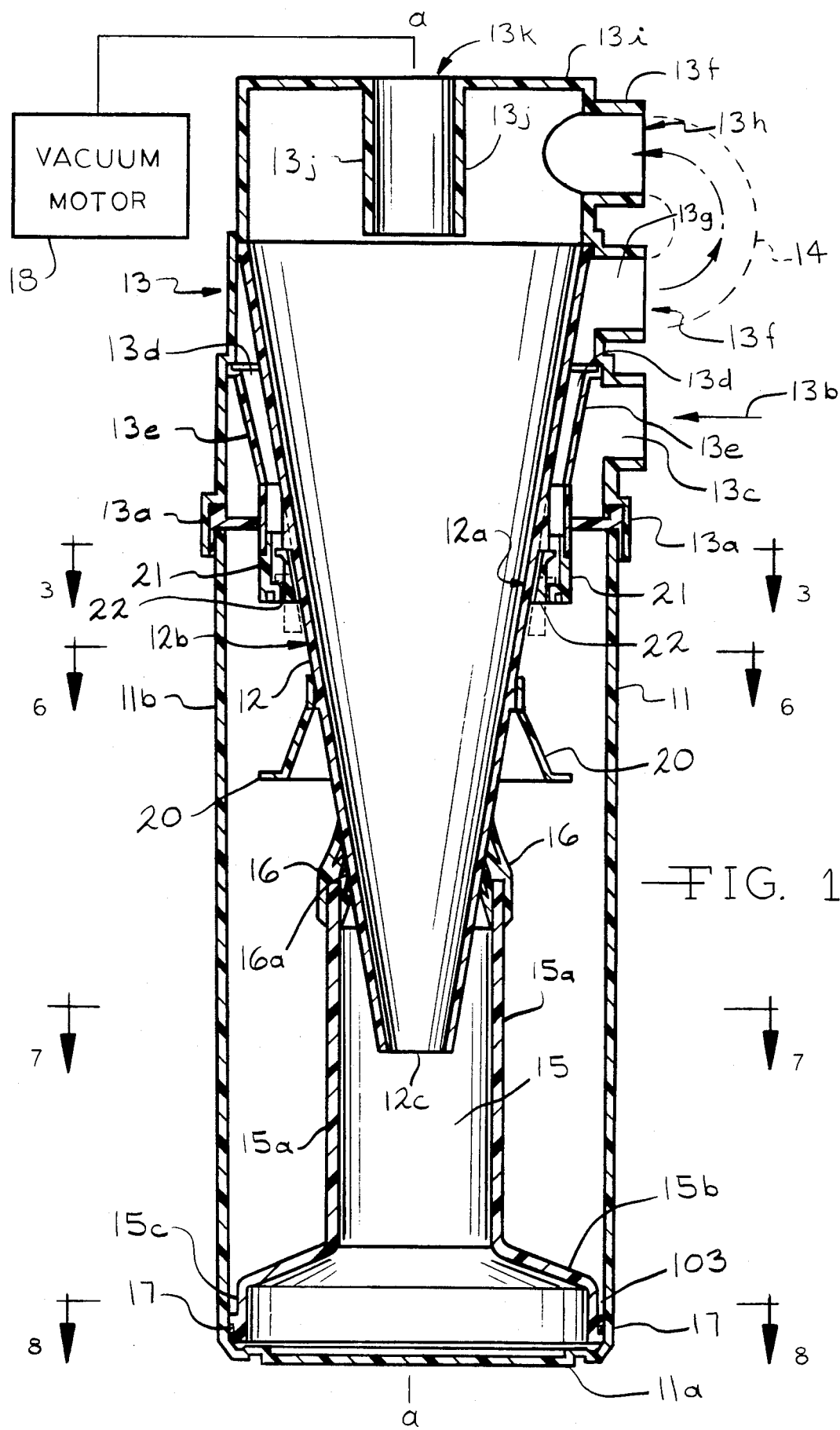
FIG. 1 is a front cross-sectional view of the improved apparatus of the present invention particularly illustrating a movable collar 22 and a disc 20 intermediate the bottom of an outer container and the air outlet.
Figure 3:
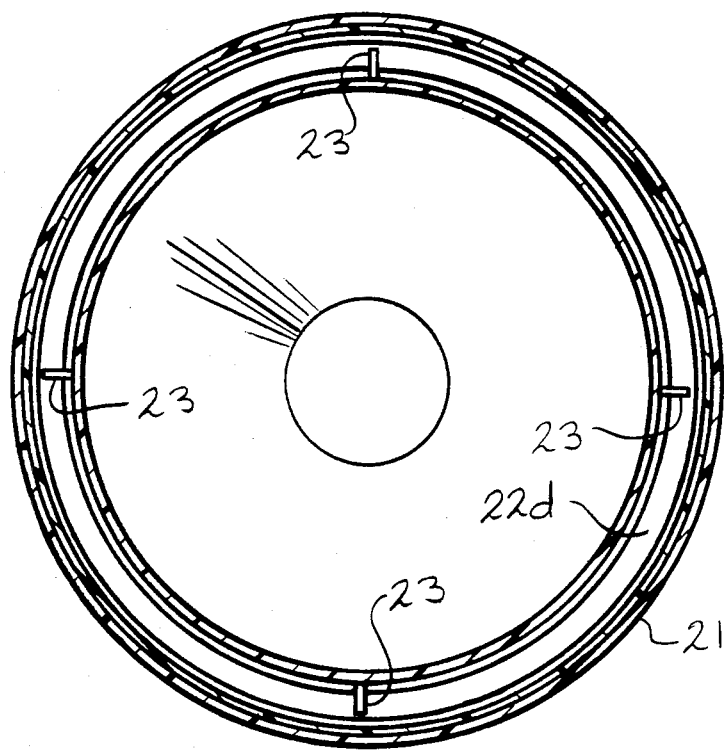

FIG. 3 is a plan cross-sectional view along line 3—3 of FIG. 1 showing stops 23 for collar 22.

Figure 4:
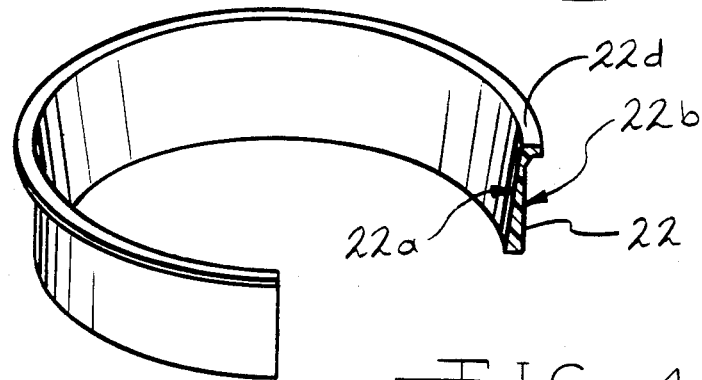

FIG. 4 is an isometric view of the collar 22 shown in FIG. 1.

Figure 5:
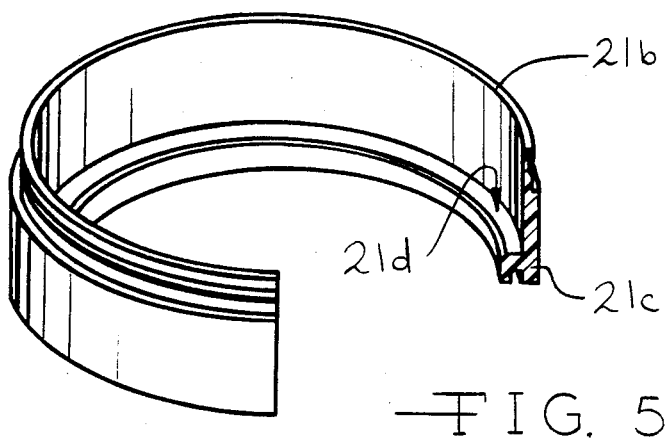

FIG. 5 is an isometric view of the shroud 21 which holds the collar 22 on the air outlet.

Figure 6:
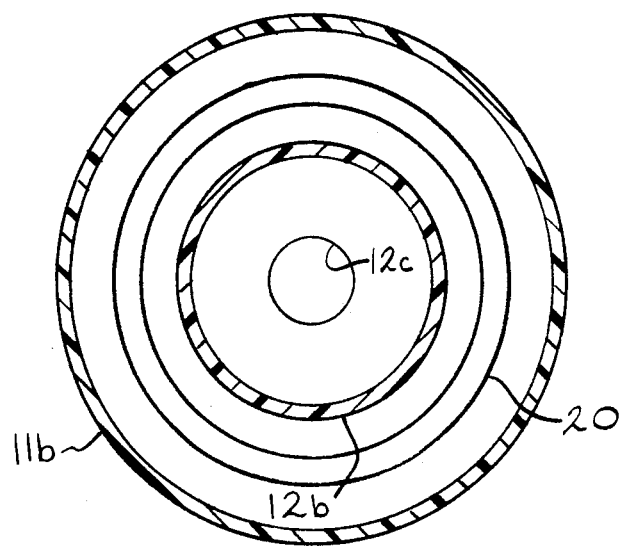
Figure 7:
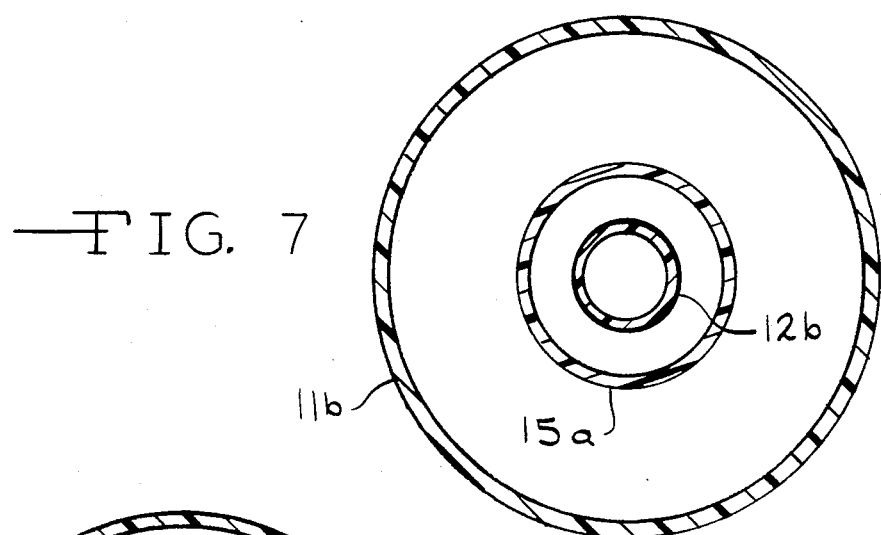
Figure 8:
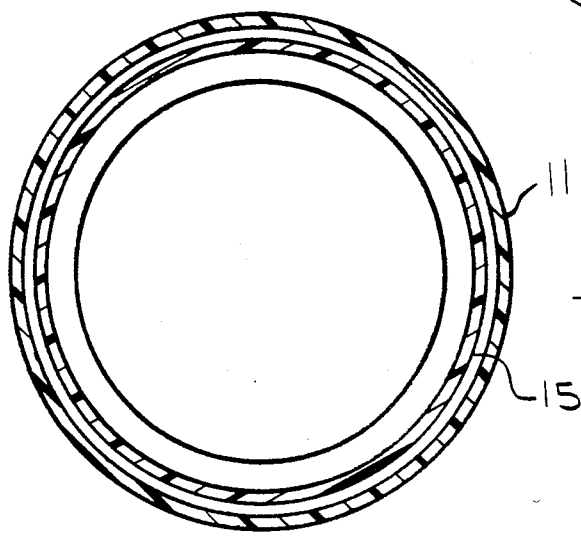

FIGS. 6 to 8 are plan cross-sectional views along lines 6—6, 7—7 and 8—8, respectively, of FIG. 1 showing the circular cross-sections of various parts of the apparatus.

GENERAL DESCRIPTION

The present invention relates to a cleaning apparatus including an outer container comprising a bottom and a sidewall extending to and meeting the bottom, the sidewall having an interior surface, a dirty air inlet at an upper portion of the outer container spaced from the bottom which is oriented for supplying dirt laden air into the container tangentially to the interior surface of the outer container which has a circular cross-section and an air outlet from the container at the upper portion of the container; a circular cross-sectioned cyclone having a longitudinal axis and mounted inside the container, the cyclone comprising a cyclone air inlet at an upper end having a first diameter of the cyclone in air communication with the air outlet of the container, an interior dirt rotational surface of frusto-conical shape for receiving an air flow from the air inlet and for maintaining its velocity to a cone opening smaller in diameter than the diameter of the upper end of the cyclone, the air inlet being oriented for supplying air tangentially to the surface, an outer surface of frusto-conical shape, and a cyclone air outlet communicating with the interior of the cyclone adjacent the upper end of the cyclone; a dirt receiving and collecting chamber extending from the cone opening; and means for generating an air flow which passes sequentially through the dirty air inlet, the container, the cyclone air inlet, the cyclone, the receiving chamber and the cyclone air outlet, the air flow rotating around the frusto-conical interior surface of the cyclone and depositing the dirt in the receiving chamber the improvement which comprises: shroud means which provides an extension of the air outlet from the container mounted around the outer surface of the cyclone, the shroud means having a circular cross-section around the longitudinal axis of the cyclone and extending from the air outlet towards the bottom of the container; and collar means moveably mounted on the shroud means around the outer surface of the cyclone so as to be moveable parallel to the longitudinal axis of the cyclone into the shroud means when the air flow is generated and out of the shroud means when the air flow is stopped to thereby prevent dirt from being entrapped in the air outlet.

Further the present invention relates to a cleaning apparatus including an outer container comprising a bottom and a sidewall extending to and meeting the bottom, the sidewall having an interior surface, a dirty air inlet at an upper portion of the outer container spaced from the bottom which is oriented for supplying dirt laden air into the container tangentially to the interior surface of the outer container which has a circular cross-section and an air outlet from the container at the upper portion of the container; a circular cross-sectioned cyclone having a longitudinal axis and mounted inside the container, the cyclone comprising a cyclone air inlet at an upper end having a first diameter of the cyclone in air communication with the air outlet of the container, an interior dirt rotational surface of frusto-conical shape for receiving an air flow from the air inlet and for maintaining its velocity to a cone opening smaller in diameter than the diameter of the upper end of the cyclone, the air inlet being oriented for supplying air tangentially to the surface, an outer surface of frusto-conical shape, and a cyclone air outlet communicating with the interior of the cyclone adjacent the upper end of the cyclone; a dirt receiving and collecting chamber extending from the cone opening; and means for generating an air flow which passes sequentially through the dirty air inlet, the container, the cyclone air inlet, the cyclone, the receiving chamber and the cyclone air outlet, the air flow rotating round the frusto-conical interior surface of the cyclone and depositing the dirt in the receiving chamber the improvement which comprises: a disc means provided on the outside of the cyclone intermediate the receiving chamber and the air outlet of the container and around to the longitudinal axis of the cyclone with a space between the interior surface of the container and the disc means for passage of air wherein the disc means retards long strands in the dirt from clogging the air outlet and retains the strands in the container.

SPECIFIC DESCRIPTION

FIGS. 6 to 8 show a cleaning apparatus 10, an outer cyclone or container 11 and an inner cyclone 12. The cyclones 11 and 12 are relatively long and slender along longitudinal axis a-a. The outer cyclone 11 has a bottom 11a and a cylindrical inner surface 11b. The outer cyclone 11 is removable from an air flow directing head 13 where lips 13a engage the outside surface 11c of the outer cyclone 11. The head 13 includes a dirty air inlet passage 13b, inlet port 13c and an air outlet 13d defined by a tapered portion 13e on head 13 leading to outlet passage 13f in outlet port 13g. In the cylindrical portion 13i of head 13 an outlet port 13j is provided for removal of clean air through passage 13k. As shown by the dotted lines in FIG. 1, tube 14 connects the outlet port 13g to an inlet port 13f having a tangential entry passage 13h in cylindrical portion 13i of head 13.

The inner cyclone 12 has a frusto-conical shape and inner wall 12a leading to a cone opening 12c and outer wall 12b. A portion of the cyclone 12 and cone opening 12c projects into a receiving and collecting chamber 15 for collecting dirt from the cyclone 12. The outer wall 12b of the inner cyclone 12 engages a tapered ring seal 16 mounted on the receiving chamber 15. The tapered seal 16 includes concentric rings 16a engaging outer wall 12b and is mounted on an elongate cylindrical portion 15a of the receiving chamber 15. The receiving chamber 15 is preferably integrally joined with a frusto-conical or outwardly tapered portion 15b which is in turn integral with a short cylindrical portion 15c. An o-ring seal 17 provides an air seal between the receiving chamber 15 and the outer cyclone 11. The outlet port 13j is connected with a fan unit 18.

Figure 2:
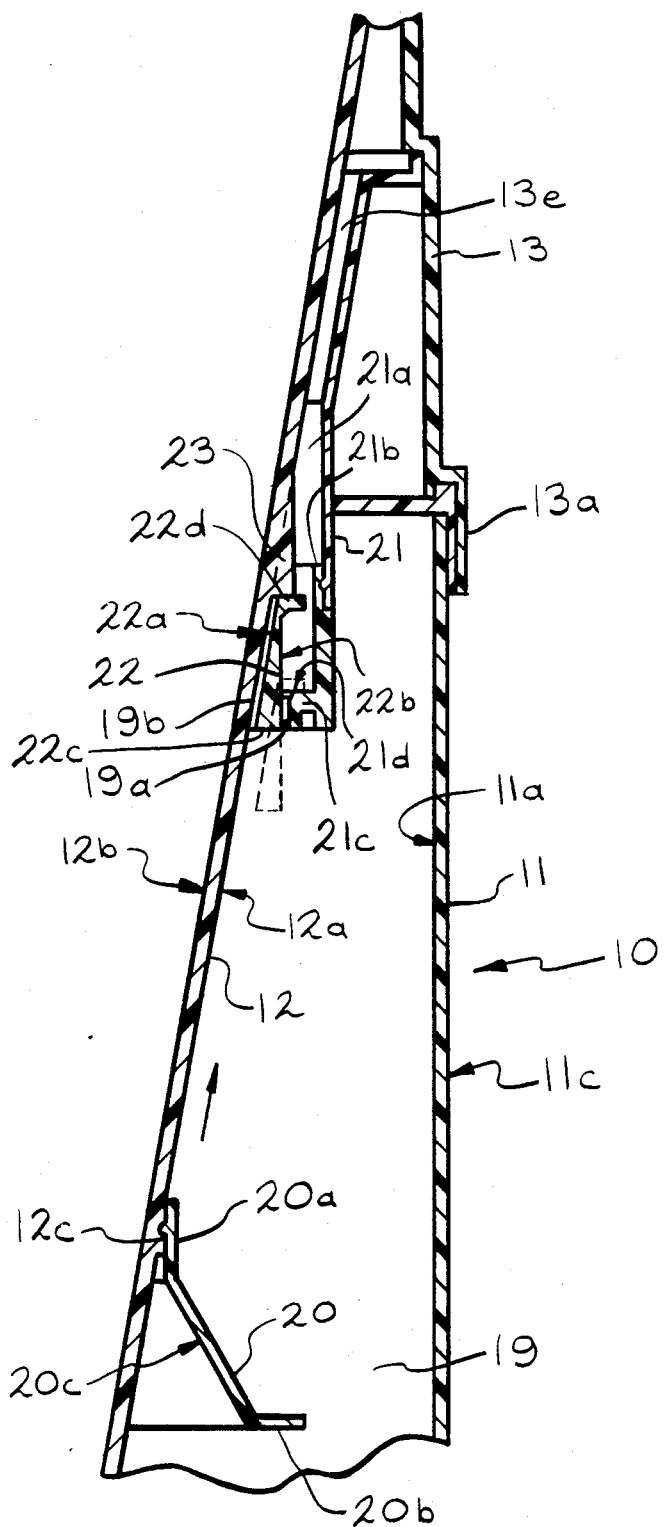
FIG. 2 is an enlarged cross-sectional view of the collar 22 and disc 20 shown in FIG. 1.

As can be particularly seen from FIGS. 1 and 2, a disc 20 is positioned on the outside surface 12b of the cyclone 12. The disc 20 includes a detent 20a (FIG. 2) in smaller opening 20b which engages an attachment ring 12c on the cyclone 12. The disc 20 includes a downwardly tapered wall 20c and an annular flange 20d extending towards the inside wall 11a of the container 11. The disc 20 retards long strands, such as hair, from moving upwards into air outlet 13d through a shroud 21 attached to outlet 13d. The disc 20 can have any shape which is circular around the axis a-a and leaves an air passage 19.

The shroud 21 attaches to the tapered portion 13e around the outside surface 12a of the cyclone 12. The shroud 21 includes a removable portion 21c which allows the removal of a vertically moveable collar 22. The collar 22 moves from a rest position in the shroud 21 without the fan 18 operating as shown by the dotted lines in FIG. 2 to an operating position as shown by the solid lines in FIG. 2. The collar 22 engages stops (FIG. 3) 23 in the operating mode with the fan 18 operating.

In its preferred form, the collar 22 has a right triangular cross-section including a hypotenuse 22a which gives the collar 22 a taper corresponding to that of the outer surface 12b of the cyclone 12, a long side 22b which is parallel to the axis a-a and a short side 22c which connects the long side 22b and the hypotenuse 22a. The vertex of the hypotenuse 22a and long side 22b is provided with a rim 22d which engages a lip 21d of the shroud 21. The angle between the hypotenuse 22a and the long side 22b is preferably between about 9 and 11 degrees.

The short side 22c of the collar 22 is blunted so that air flow created by fan 18 lifts the collar 22 and moves the collar 22 into the shroud 21. Any similar configuration of the collar 22 which allows the collar 22 to move in the shroud 21 is satisfactory. Generally the collar has a smaller end inside the collar 22 and a larger end projecting from the collar 22 when there is no air flow. The larger end has a surface area which is in the air flow path to cause the collar 22 to move into the shroud 21 when air flow is generated.

In operation, the fan 18 is turned on and the collar 22 moves into the shroud 21. Larger particles of dirt may lodge in the spaces 19a and 19b between the collar and the shroud 21. When air flow is stopped by turning off the fan 18, the collar moves towards the bottom 11a of the container 11 and any accumulated dirt falls back into the container 11. In this manner only very fine dirt particles are carried over into the cyclone 12 and are deposited in the receiving chamber 15.

The disc 20 retards the flow of long strands of dirt into the shroud 21. The long strands are curled into a ball and thus remain in the container 11.

The apparatus can be in the form of an upright vacuum cleaner as described in Canadian Pat. No. 1,182,613 and in the inventor's U.S. Pat. application Ser. No. 628,346, filed July 6, 1984 and Ser. No. 640,758 filed Aug. 14, 1984.

It is intended that the foregoing description only be illustrative of the present invention and the invention is limited only by the hereinafter appended claims.

I claim:

1. In a cleaning apparatus including an outer container comprising a bottom and a sidewall extending to and meeting the bottom, the sidewall having an interior surface, a dirty air inlet at an upper portion of the outer container spaced from the bottom which is oriented for supplying dirt laden air into the container tangentially to the interior surface of the outer container which has a circular cross-section and an air outlet from the container at the upper portion of the container; a circular cross-sectioned cyclone having a longitudinal axis and mounted inside the container, the cyclone comprising a cyclone air inlet at an upper end having a first diameter of the cyclone in air communication with the air outlet of the container, an interior dirt rotational surface of frusto-conical shape for receiving an air flow from the air inlet and for maintaining its velocity to a cone opening smaller in diameter than the diameter of the upper end of the cyclone, the air inlet being oriented for supplying air tangentially to the surface, an outer surface of frusto-conical shape, and a cyclone air outlet communicating with the interior of the cyclone adjacent the upper end of the cyclone; a dirt receiving and collecting chamber extending from the cone opening; and means for generating an air flow which passes sequentially through the dirty air inlet, the container, the cyclone air inlet, the cyclone, the receiving chamber and the cyclone air outlet, the air flow rotating around the frusto-conical interior surface of the cyclone and depositing the dirt in the receiving chamber the improvement which comprises:

(a) shroud means which provides an extension of the air outlet from the container mounted around the outer surface of the cyclone, the shroud means having a circular cross-section around the longitudinal axis of the cyclone and extending from the air outlet towards the bottom of the container; and (b) collar means moveably mounted on the shroud means around the outer surface of the cyclone so as to be moveable parallel to the longitudinal axis of the cyclone into the shroud means when the air flow is generated and out of the shroud means when the air flow is stopped to thereby prevent dirt from being entrapped in the air outlet.

2. The apparatus of claim 1 wherein the collar means has a larger end projecting from the shroud means towards the bottom of the container with a rim on a smaller end opposite the larger end which rests on a lip of the shroud means when the air flow is stopped.

3. The apparatus of claim 2 wherein the collar means has a cross-section positioned along the longitudinal axis in the form of a right triangle with the hypotenuse adjacent to and parallel to the outer surface of the cyclone, a short side at the larger end of the collar means perpendicular to the longitudinal axis and a long side parallel to the longitudinal axis and wherein the rim is positioned on the collar means adjacent the intersection of the long side and the hypotenuse at the smaller end of the collar means.

4. The apparatus of claim 3 wherein the collar means has an angle of between about 9° and 11° between the long side and the hypotenuse.

5. The apparatus of claim 1 wherein a portion of the shroud means is removable so that the collar means can be separated from the shroud.

6. The apparatus of claim 1 wherein a stop means is provided on the outer surface cyclone to restrict the movement of the collar means into the shroud when the air flow is generated in the apparatus.

7. The apparatus of claim 6 wherein the stop means is engaged by the rim on the collar means.

8. The apparatus of claim 1 wherein a disc means is attached on the outside of the cyclone around the longitudinal axis and intermediate the shroud means and dirt receiving and collecting chamber with a space between the interior surface of the container and the disc means wherein the disc means retards long strands in the dirt from clogging the air outlet and retains the strands in the container.

9. The apparatus of claim 1 wherein the collar means has a larger end projecting from the shroud means towards the bottom of the container with a rim or a smaller end opposite the larger end which rests on a lip of the shroud means when the air flow is stopped and wherein a disc means is provided on the outside of the cyclone around the longitudinal axis and intermediate the shroud means and dirt receiving and collecting chamber with a space between the interior surface of the container and the disc means wherein the disc means retards long strands in the dirt from clogging the air outlet and retains the strands in the container.

10. The apparatus of claim 9 wherein the collar means has a cross-section positioned along the longitudinal axis in the form of a right triangle with the hypotenuse adjacent to and parallel to the outer surface of the cyclone, a short side at the larger end of the collar means perpendicular to the longitudinal axis and a long side parallel to the longitudinal axis and the rim is positioned on the collar means adjacent the intersection of the long side and the hypotenuse at the smaller end of the collar means which rests on the lip of the shroud means when the air flow is stopped.

11. The apparatus of claim 10 wherein the collar means has an angle of between about 9° and 11° between the long side and the hypotenuse.

12. The apparatus of claim 9 wherein a stop means is provided on the outer surface of the cyclone to restrict the movement of the collar means into the shroud means when the air flow is generated in the apparatus.

13. The apparatus of claim 12 wherein the stop means is engaged by the rim on the collar means.

14. The apparatus of claim 13 wherein the stop means is provided by projections from the outer surface of and around the longitudinal axis of the cyclone.

15. In a cleaning apparatus including an outer container comprising a bottom and a sidewall extending to and meeting the bottom, the sidewall having an interior surface, a dirty air inlet at an upper portion of the outer container spaced from the bottom which is oriented for supplying dirt laden air into the container tangentially to the interior surface of the outer container which has a circular cross-section and an air outlet from the container at the upper portion of the container; a circular cross-sectioned cyclone having a longitudinal axis and mounted inside the container, the cyclone comprising a cyclone air inlet at an upper end having a first diameter of the cyclone in air communication with the air outlet of the container, an interior dirt rotational surface of frusto-conical shape for receiving an air flow from the air inlet and for maintaining its velocity to a cone opening smaller in diameter than the diameter of the upper end of the cyclone, the air inlet being oriented for supplying air tangentially to the surface, an outer surface of frusto-conical shape, and a cyclone air outlet communicating with the interior of the cyclone adjacent the upper end of the cyclone; a dirt receiving and collecting chamber extending from the cone opening; and means for generating an air flow which passes sequentially through the dirty air inlet, the container, the cyclone air inlet, the cyclone, the receiving chamber and the cyclone air outlet, the air flow rotating around the frusto-conical interior surface of the cyclone and depositing the dirt in the receiving chamber the improvement which comprises:

a disc means provided on the outside of the cyclone intermediate the receiving chamber and the air outlet of the container and around to the longitudinal axis of the cyclone with a space between the interior surface of the container and the disc means for passage of air wherein the disc means retards long strands in the dirt from clogging the air outlet and retains the strands in the container.

16. The apparatus of claim 15 wherein the disc means is circular around the longitudinal axis of the cyclone.

17. The apparatus of claim 16 wherein the disc means is conical in shape around the longitudinal axis with a smaller opening attached to the outer surface of the cyclone and a larger opening below the smaller opening facing the bottom of the container such that there is a tapered wall between the openings.

18. The apparatus of claim 17 wherein the larger opening has a flange perpendicular to the longitudinal axis of the container between the larger opening of the disc means and the inside surface of the container.

* * * * *